United States Patent
Seguchi

(10) Patent No.: US 11,251,688 B2
(45) Date of Patent: Feb. 15, 2022

(54) FIELD-WINDING-TYPE ROTATING ELECTRIC MACHINE

(71) Applicant: DENSO CORPORATION, Kariya (JP)

(72) Inventor: Masahiro Seguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/989,015

(22) Filed: Aug. 10, 2020

(65) Prior Publication Data

US 2020/0373822 A1 Nov. 26, 2020

Related U.S. Application Data

(63) Continuation of application No. PCT/JP2019/003186, filed on Jan. 30, 2019.

(30) Foreign Application Priority Data

Feb. 8, 2018 (JP) .............................. JP2018-020856

(51) Int. Cl.
*H02K 19/28* (2006.01)
*H02K 11/049* (2016.01)
(Continued)

(52) U.S. Cl.
CPC ............... *H02K 19/28* (2013.01); *H02K 3/46* (2013.01); *H02K 11/049* (2016.01); *H02K 11/33* (2016.01); *H02K 21/042* (2013.01)

(58) Field of Classification Search
CPC ........... H02K 3/51; H02K 3/46; H02K 19/28; H02K 21/042; H02K 11/33; H02K 11/049;
(Continued)

(56) References Cited

U.S. PATENT DOCUMENTS 7,880,424 B2 * 2/2011 Seguchi ................. H02P 9/009
318/712
2006/0290316 A1 12/2006 Seguchi et al.
(Continued)

FOREIGN PATENT DOCUMENTS

JP 2008-178211 A 7/2008
JP 2013-005510 A 1/2013

OTHER PUBLICATIONS

Apr. 16, 2019 International Search Report issued in International Patent Application No. PCT/JP2019/003186.

*Primary Examiner* — Tran N Nguyen
*Assistant Examiner* — Leda T Pham
(74) *Attorney, Agent, or Firm* — Oliff PLC

(57) ABSTRACT

In a rotating electric machine, a stator includes a stator winding, a field winding includes a series-connection body including a plurality of winding portions, and a rotor includes main pole portions protruding from a rotor core in a radial direction. A harmonic current for inducing a field current in the field winding flows to the stator winding. A rectifying element is connected in series to the field winding, configures a closed circuit with the field winding, and rectifies the field current that flows to the field winding to flow in one direction. In a capacitor, a first end is connected to a connection point between adjacent winding portions and a second end is connected to either of both ends of the rectifying element. A partitioning portion is disposed between at least a single set of adjacent winding portions among the plurality of winding portions and includes a magnetic material.

10 Claims, 15 Drawing Sheets

(51) Int. Cl.
*H02K 11/33* (2016.01)
*H02K 3/46* (2006.01)
*H02K 21/04* (2006.01)

(58) Field of Classification Search
CPC .......... H02K 19/12; H02K 19/16; H02K 1/00;
H02K 1/16; H02K 1/24; H02K 1/26;
H02K 3/00; H02K 3/12; H02K 3/28;
H02K 3/48; H02K 9/00; H02K 9/22;
H02K 11/00; H02K 11/02; H02K 11/04;
H02K 19/00; H02K 19/26; H02K 19/36;
H02K 23/00; H02K 23/66; H02P 25/098;
H02P 6/32
USPC ............ 310/68 R, 179–180, 184, 190, 261.1
See application file for complete search history.

(56) References Cited

U.S. PATENT DOCUMENTS

2010/0259136 A1* 10/2010 Hiramoto ............... H02K 19/12
310/68 D
2015/0194855 A1* 7/2015 Kubo ..................... H02K 1/246
310/68 D

* cited by examiner $$f1 = \frac{1}{2\pi\sqrt{L1 \times C}}$$

$$f2 = \frac{1}{2\pi\sqrt{L2 \times C}}$$

(a) FUNDAMENTAL CURRENT (b) HARMONIC CURRENT (c) COMPOSITE CURRENT

COMPARISON EXAMPLE

COMPARISON EXAMPLE

FIG.9
COMPARISON EXAMPLE
| PATTERN | | 1 | 2 | 3 | 4 |
|---|---|---|---|---|---|
| GENERATED VOLTAGE DIRECTION | e1 | ↑ | ↓ | ↑ | ↓ |
| | e2 | ↑ | ↑ | ↓ | ↓ |
FIG.10
(a) 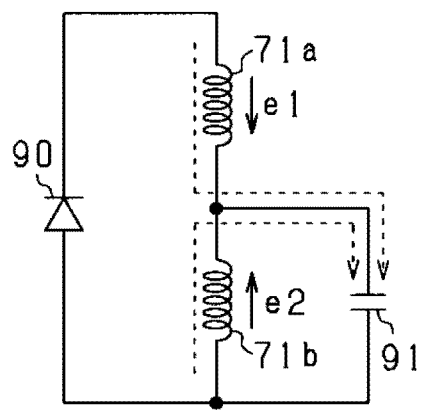  (b) 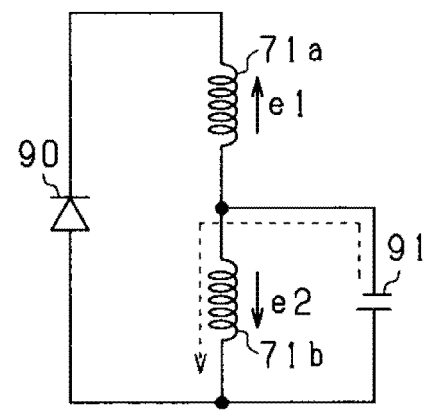

(a) FUNDAMENTAL CURRENT (b) HARMONIC CURRENT (c) COMPOSITE CURRENT $$\begin{pmatrix} \cdot\ f1 < f2 = fh < f3 \\[6pt] \cdot\ f1 = \dfrac{1}{2\pi\sqrt{L1 \times C1}} \\[6pt] \cdot\ f2 = \dfrac{1}{2\pi\sqrt{L2 \times Ct}},\ Ct = \dfrac{C1 \times C2}{C1 + C2} \\[6pt] \cdot\ f3 = \dfrac{1}{2\pi\sqrt{L3 \times C2}} \end{pmatrix}$$

FIELD-WINDING-TYPE ROTATING ELECTRIC MACHINE

CROSS-REFERENCE TO RELATED APPLICATIONS

The present application is based on and claims the benefit of priority of Japanese Patent Application No. 2018-020856, filed on Feb. 8, 2018, the description of which is incorporated herein by reference.

BACKGROUND

Technical Field

The present disclosure relates to a field-winding-type rotating electric machine.

Related Art

As this type of rotating electric machine, a rotating electric machine that includes a stator that has a stator winding, a field winding that is configured by a series-connection body of two winding portions, a rotor that has a rotor core and main pole portions, and a rectifying element is known. The main pole portions are provided at predetermined intervals in a circumferential direction and protrude in a radial direction from the rotor core. The rectifying element is connected in series to the field winding and configures a closed circuit together with the field winding. The rectifying element rectifies a field current that flows to the field winding to flow in one direction. The two winding portions are each wound around a common main pole portion. A fundamental current that mainly generates torque and a harmonic current that mainly excites the field winding flow to the stator winding.

SUMMARY

An aspect of the present disclosure provides a rotating electric machine that includes a stator, a field winding, and a rotor. The stator includes a stator winding. The field winding includes a series-connection body including a plurality of winding portions. The rotor includes main pole portions protruding from a rotor core in a radial direction. Each of the plurality of winding portions is wound around the main pole portion. A harmonic current for inducing a field current in the field winding flows to the stator winding. The rotating electric machine also includes a rectifying element, a capacitor, and a partitioning portion. The rectifying element is connected in series to the field winding, configures a closed circuit with the field winding, and rectifies the field current that flows to the field winding to flow in one direction. In the capacitor, a first end is connected to a connection point between adjacent winding portions among the plurality of winding portions and a second end is connected to either of both ends of the rectifying element. The partitioning portion is disposed between at least a single set of adjacent winding portions among the plurality of winding portions and includes a magnetic material.

BRIEF DESCRIPTION OF THE DRAWINGS

In the accompanying drawings:

FIG. 5 is a diagram of transitions in a fundamental current, a harmonic current, and the like;

FIG. 9 is a diagram of generated patterns for induced voltage in the comparison example;

FIG. 10 is a diagram of electrical circuits corresponding to generated patterns 2 and 3;

DESCRIPTION OF THE EMBODIMENTS

Figure 1:
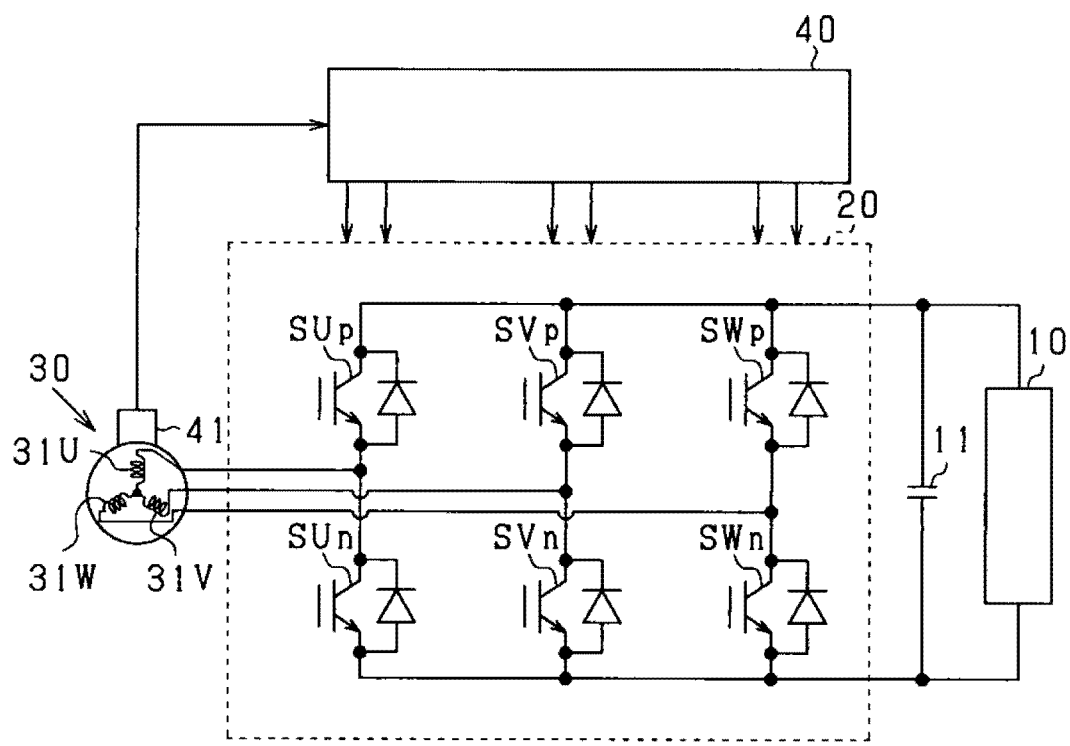
FIG. 1 is an overall configuration diagram of a control system of a rotating electric machine according to a first embodiment.

As shown in JP-A-2008-178211, as this type of rotating electric machine, a rotating electric machine that includes a stator that has a stator winding, a field winding that is configured by a series-connection body of two winding portions, a rotor that has a rotor core and main pole portions, and a rectifying element is known. The main pole portions are provided at predetermined intervals in a circumferential direction and protrude in a radial direction from the rotor core. The rectifying element is connected in series to the field winding and configures a closed circuit together with the field winding. The rectifying element rectifies a field current that flows to the field winding to flow in one direction. The two winding portions are each wound around a common main pole portion. A fundamental current that mainly generates torque and a harmonic current that mainly excites the field winding flow to the stator winding.

When the harmonic current flows, a main magnetic flux flows to a magnetic circuit that includes main pole portions that are adjacent in the circumferential direction and the rotor core. As a result of the main magnetic flux flowing, an induced voltage is generated in each of the two winding portions that are connected in series. A current is induced in the winding portion. At this time, the rectifying element rectifies the current that flows to the winding portion to flow in one direction. As a result, a field current flows to the field winding in the direction of rectification by the rectifying element, and the field winding is excited.

Meanwhile, when the harmonic current flows, a leakage flux is generated in addition to the main magnetic flux. The leakage flux flows so as to cross from one to the other of the main pole portions that are adjacent in the circumferential direction, without passing through the rotor core, and is linked with the field winding. In this case, in the same winding portion, induced voltages of opposite polarities are generated and the current that is induced decreases. As a result, a total value of the currents that are respectively induced in the two winding portions decreases. Furthermore, the field current that flows to the field winding decreases. Here, to compensate for the decrease in field current, increasing an amplitude of the harmonic current that is supplied to the stator winding can be considered. However, in this case, increase in torque ripples in the rotating electric machine becomes a concern.

It is thus desired to provide a field-winding-type rotating electric machine that is capable of increasing a field current that flows to a field winding.

A first disclosure provides a field-winding-type rotating electric machine that includes: a stator that includes a stator winding; a field winding that includes a series-connection body including a plurality of winding portions; and a rotor that includes a rotor core, and main pole portions that are provided at predetermined intervals in a circumferential direction and protrude from the rotor core in a radial direction, in which each of the plurality of winding portions is wound around the main pole portion, and a harmonic current for inducing a field current in the field winding flows to the stator winding. The field-winding-type rotating electric machine includes: a rectifying element that is connected in series to the field winding, configures a closed circuit with the field winding, and rectifies the field current that flows to the field winding to flow in one direction; a capacitor of which a first end is connected to a connection point between adjacent winding portions and a second end is connected to either of both ends of the rectifying element; and a partitioning portion that is disposed between at least a single set of adjacent winding portions among the plurality of winding portions, and includes a magnetic material.

The first disclosure includes the partitioning portion that includes a magnetic material. As a result, a large portion of leakage flux flows through the partitioning portion instead of the field winding. Consequently, induced voltages that are of opposite polarities are not easily generated in the same winding portion. A current that is induced increases. As a result, the field current that flows to the field winding can be increased.

In addition, the first disclosure includes the capacitor of which the first end is connected to the connection point between adjacent winding portions and the second end is connected to either of both ends of the rectifying element. Therefore, even in cases in which the induced voltages that are respectively generated in a pair of winding portions to which the capacitor is connected are of opposite polarities, the induced currents that flow to the pair of winding portions do not cancel each other out and, for example, flow towards the rectifying element side via the capacitor. As a result, the field current that flows to the field winding can be increased. At this time, because the field current is increased by the partitioning portion, the effect of increasing the field current obtained by the capacitor can be further enhanced.

As described above, as a result of the first disclosure, the field current can be increased. Therefore, an amplitude of the harmonic current that flows to the stator winding can be reduced. Furthermore, torque ripples in the rotating electric machine can be reduced.

According to a second disclosure, the plurality of winding portions are each wound around the main pole portion so as to be arranged in the radial direction. The partitioning portion is configured to extend in the circumferential direction.

In the second disclosure, the partitioning portion is configured to extend in the circumferential direction. As a result of this configuration, a magnetic path that leads the leakage flux from one to the other of the main pole portions that are adjacent in the circumferential direction, via the partitioning portion, can be appropriately constructed.

According to a third disclosure, a gap is formed between the partitioning portions that are adjacent in the circumferential direction.

As a result of the third disclosure, a main magnetic flux flowing from one to the other of the main pole portions that are adjacent in the circumferential direction, via the partitioning portion, can be suppressed. Consequently, decrease in the main magnetic flux that flows to a magnetic circuit that includes the main pole portions that are adjacent in the circumferential direction and the rotor core can be suppressed. Decrease in the field current can be suppressed.

According to a fourth disclosure, an envelope curve of the harmonic current that flows to the stator has a period that is half that of a fundamental current that flows to the stator winding. A timing at which the envelope curve reaches a peak value thereof is shifted from a timing at which the fundamental current reaches a peak value thereof.

As a result of the fourth disclosure, a maximum value of the current that flows to the stator winding can be reduced, compared to when the timing at which the envelope curve reaches the peak value thereof and the timing at which the fundamental current reaches the peak value thereof are the same. Consequently, torque of the rotating electric machine can be set to a supposed torque without a capacity of an inverter that is connected to the stator winding being increased.

According to a fifth disclosure, the timing at which the envelope curve reaches the peak value thereof is the same timing as a timing at which the fundamental current is at a variation center thereof. As a result of the fifth disclosure, the effect of reducing the maximum value of the current that flows to the stator winding can be enhanced.

According to a sixth disclosure, a resonance frequency of at least either of a resonance circuit that is configured by one winding portion, of the adjacent winding portions to which the capacitor is connected, and the capacitor, and a resonance circuit that is configured by the other winding portion and the capacitor is a frequency of the harmonic current that flows to the stator winding.

As a result of the sixth disclosure, the current that is induced in the winding portion can be further increased. The field current can be further increased.

According to a seventh disclosure, the field winding includes a series-connection body including three or more winding portions. The capacitor is individually provided in correspondence to each connection point between the adjacent winding portions. Resonance frequencies of the resonance circuits corresponding to the winding portions differ from each other.

As a result of the seventh disclosure, in addition to the resonance circuit in which the frequency of the harmonic current is the resonance frequency, a resonance circuit in which a frequency that differs from the frequency of the harmonic current is the resonance frequency can be actualized. Consequently, for example, even in cases in which the frequency of the harmonic current that is supplied to the stator winding is shifted from a frequency that has been set, as long as the shifted frequency is the resonance frequency of the other resonance circuit, the effect of increasing the field current can be obtained at the frequency.

According to an eighth disclosure, the field winding is configured by an alpha (a) winding.

As a result of the eighth disclosure, the field winding can be assembled so as to be inserted into the main pole portion in the radial direction. Therefore, assembly of the field winding can be improved. In addition, as a result of the alpha winding, start of winding and end of winding of the field winding face the same direction. Therefore, connection of the winding portions of the field winding, the rectifying element, and the capacitor can be easily performed.

According to ninth and tenth disclosures, a first resonance frequency of a resonance circuit that is configured by one winding portion, of the adjacent winding portions to which the capacitor is connected, and the capacitor is a value that is less than a second resonance frequency of a resonance circuit that is configured by the other winding portion and the capacitor. When a deviation between a median value of the first resonance frequency and the second resonance frequency and each of the first resonance frequency and the second resonance frequency is a frequency deviation, the frequency of the harmonic current that flows to the stator winding is set to be in a range from a value obtained by the frequency deviation being subtracted from the first resonance frequency to a value obtained by the frequency deviation being added to the second resonance frequency.

Resonance characteristics of the resonance circuit can be considered to be equal before and after the resonance frequency of the circuit. Therefore, the resonance characteristics of the resonance circuit can be improved by the frequency of the harmonic current that flows to the stator winding being set as described above.

Embodiments will hereinafter be described with reference to the drawings. For example, a rotating electric machine according to the present embodiment is mounted in a vehicle. Here, sections among the embodiments below that are identical or equivalent to each other are given the same reference numbers in the drawings. Descriptions of sections having the same reference numbers are applicable therebetween.

First Embodiment

First, a description will be given with reference to FIG. 1 to FIG. 4. A control system includes a direct-current power supply 10, an inverter 20, a rotating electric machine 30, and a control apparatus 40. According to the present embodiment, a field-winding-type synchronous motor is used as the rotating electric machine 30. In addition, according to the present embodiment, the control apparatus 40 controls the rotating electric machine 30 such that the rotating electric machine 30 functions as an integrated starter generator (ISG) that is both an electric motor and a power generator, and a motor generator (MG). For example, an electromechanically integrated-type driving apparatus may be configured by the rotating electric machine 30, the inverter 20, and the control apparatus 40 being provided. Alternatively, the rotating electric machine 30, the inverter 20, and the control apparatus 40 may each be configured components.

The rotating electric machine 30 includes a rotor 60. A field winding 70 is wound around the rotor 60. The field winding 70 is configured by a series-connection body of a first winding portion 71a and a second winding portion 71b.

The rotating electric machine 30 includes a stator 50. A stator winding is wound around the stator 50. For example, the stator winding includes a copper wire. The stator winding includes U-, V-, and W-phase windings 31U, 31V, and 31W that are arranged so as to be shifted from each other by 120° electrical angle.

The inverter 20 includes series-connection bodies including U-, V-, and W-phase upper-arm switches SUp, SVp, and SWp, and U-, V-, and W-phase lower-arm switches SUn, SVn, and SWn. First ends of the U-, V-, and W-phase windings 31U, 31V, and 31W are connected to connection points between the U-, V-, and W-phase upper-arm switches SUp, SVp, and SWp and the U-, V-, and W-phase lower-arm switches SUn, SVn, and SWn. Second ends of the U-, V-, and W-phase windings 31U, 31V, and 31W are connected by a neutral point. That is, according to the present embodiment, the U-, V-, and W-phase windings 31U, 31V, and 31W are connected by a star connection. Here, according to the present embodiment, each of the switches SUp to SWn is an insulated-gate bipolar transistor (IGBT). A freewheeling diode is connected in reverse parallel to each of the switches SUp, SVp, SWp, Sun, SVn, and SWn.

A positive terminal of the direct-current power supply 10 is connected to collectors of the U-, V-, and W-phase upper-arm switches SUp, SVp, and SWp. A negative terminal of the direct-current power supply 10 is connected to emitters of the U-, V-, and W-phase lower-arm switches Sun, SVn, and SWn. Here, a smoothing capacitor 11 is connected in parallel to the direct-current power supply 10.

The control system includes an angle detecting unit 41. The angle detecting unit 41 outputs an angle signal that is a signal based on a rotation angle of the rotor 60. The output signal of the angle detecting unit 41 is inputted to the control apparatus 40.

Next, the stator 50 and the rotor 60 will be described.

The stator 50 and the rotor 60 are both coaxially arranged together with a rotation shaft 32. In the description below, a direction in which the rotation shaft 32 extends is an axial direction. A direction that extends in a radiating manner from a center of the rotation shaft 32 is a radial direction. A direction that extends in a circumferential manner with the rotation shaft 32 as a center is a circumferential direction.

Figure 3:
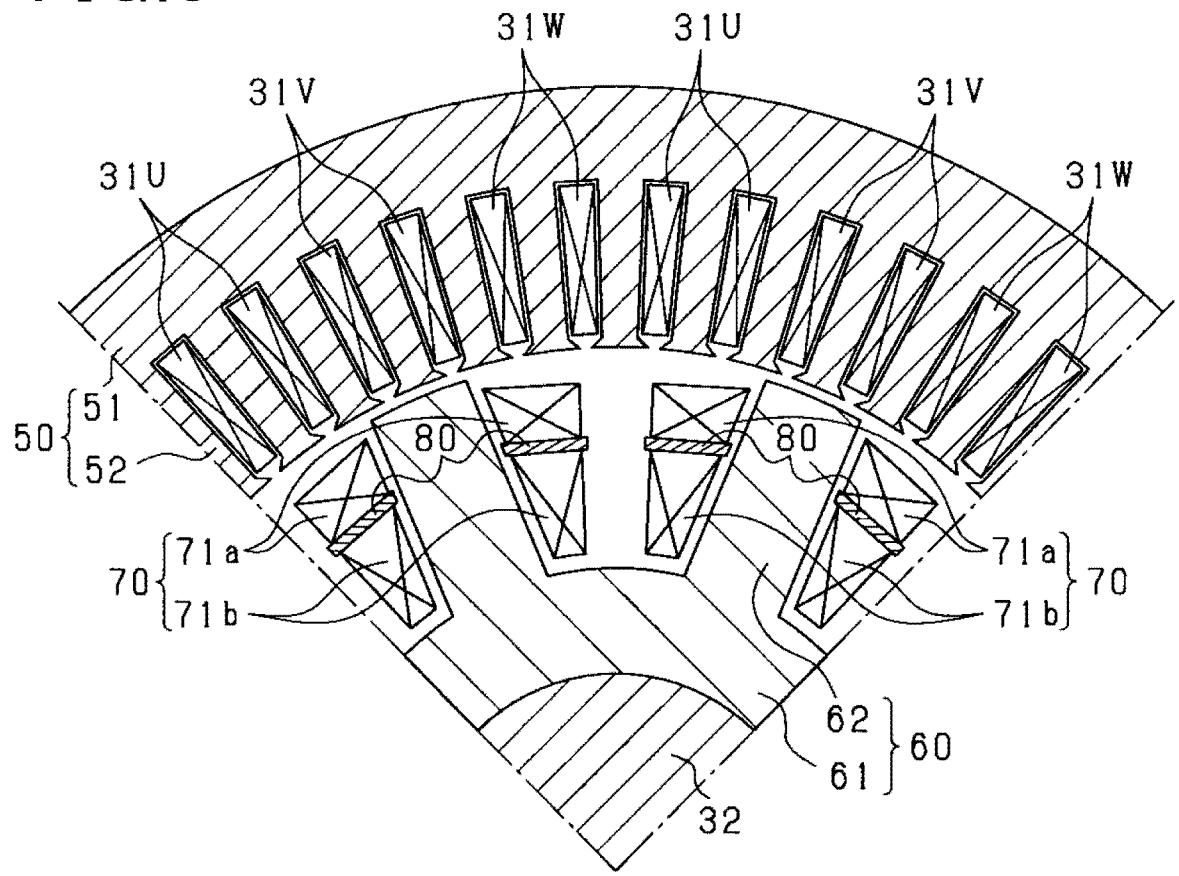
FIG. 3 is a lateral cross-sectional view of the rotor and a stator.

The stator 50 is configured by laminated steel plates that include a soft magnetic material. The stator 50 includes a circular annular stator core 51 and a plurality of teeth 52 that protrude from the stator core 51 towards an inner side in the radial direction. According to the present embodiment, the phase windings 31U, 31V, and 31W are wound by distributed winding (or concentrated winding) around the teeth 52. According to the present embodiment, as shown in FIG. 3, 48 teeth are provided at even intervals in the circumferential direction. Therefore, the rotating electric machine 30 is that which has 48 slots.

The rotor 60 is configured by laminated steel plates that include a soft magnetic material. The rotor 60 includes a circular cylindrical rotor core 61 and a plurality of main pole portions 62 that protrude from the rotor core 61 towards an outer side in the radial direction. A surface on a tip end side of each main pole portion 62 opposes an end surface of the teeth 52. According to the present embodiment, eight main pole portions 62 are provided at even intervals in the circumferential direction.

In each main pole portion 62, the first winding portion 71a is wound on the outer side in the radial direction, and the second winding portion 71b is wound further towards the inner side in the radial direction than the first winding portion 71a. In the main pole portion 62, windings direction of the first winding portion 71a and that of the second winding portion 71b are the same as each other. In addition, of the main winding portions 71a that are adjacent in the circumferential direction, the winding direction of the winding portions that are wound around one and the winding direction of the winding portions that are wound around the other are opposite. Therefore, magnetization directions of the main pole portions 62 that are adjacent in the circumferential direction are opposite of each other.

Figure 2:
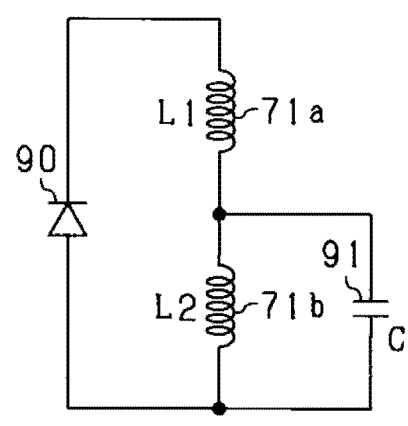
FIG. 2 is a diagram of an electrical circuit provided in a rotor.

FIG. 2 shows an electrical circuit on the rotor side that includes the winding portions 71a and 71b that are wound around a common main pole portion 62. The rotor 60 includes a diode 90 that serves as a rectifying element and a capacitor 91. A first end of the first winding portion 71a is connected to a cathode of the diode 90. A first end of the second winding portion 71b is connected to a second end of the first winding portion 71a. An anode of the diode 90 is connected to a second end of the second winding portion 71b. The capacitor 91 is connected in parallel to the second winding portion 71b. In FIG. 2, L1 denotes inductance in the first winding portion 71a, L2 denotes inductance in the second winding portion 71b, and C denotes capacitance of the capacitor 91.

As shown in FIG. 3, in the rotor 60, a partitioning portion 80 that includes a soft magnetic material is provided between the first winding portion 71a and the second winding portion 71b. For example, the partitioning portion 80 has an annular shape and is in a state in which a center hole of the partitioning portion 80 is inserted into the main pole portion 62. When viewed from the axial direction, the partitioning portion 80 has a flattened shape that extends in the circumferential direction. As a result of the partitioning portion 80 being disposed between the first winding portion 71a and the second winding portion 71b, the first winding portion 71a and the second winding portion 71b are blocked in the radial direction by the partitioning portion 80. A radial-direction thickness of the partitioning portion 80 is less than respective radial-direction thicknesses of the first winding portion 71a and the second winding portion 72a. In addition, a circumferential-direction length of the partitioning portion 80 is equal to or greater than circumferential-direction lengths of the winding portions 71a and 71b.

Figure 4:
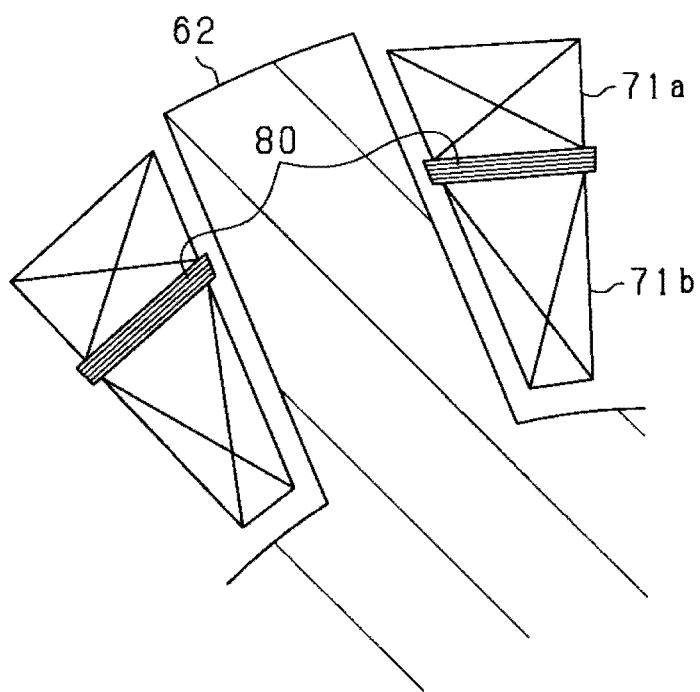
FIG. 4 is a diagram of a portion in FIG. 3 in an enlarged state.

As shown in FIG. 4, the partitioning portion 80 is configured by a soft magnetic material being laminated in the radial direction. As a result, reduction of eddy-current loss is obtained. In addition, as a result of the lamination direction being the radial direction, the radial-direction thickness of the partitioning portion 80 can be set to be thin so as to match a steel-plate thickness dimension, while ensuring the circumferential-direction length thereof.

The partitioning portion 80 is configured as a separate component from the rotor 60. As a result, processability of the rotor core 61 and assembly when the field winding 70 is assembled to the main pole portions 62 can be improved. In addition, a gap is formed between the partitioning portion 80 and the main pole portion 62. As a result, assembly when the field winding 70 is assembled to the main pole portions 62 can be improved. Furthermore, an amount of magnetic flux that is linked to each of the winding portions 71a and 17b can be easily adjusted by adjustment of gap dimensions.

Next, the control apparatus 40 will be described. Here, for example, a part or all of the functions provided by the control apparatus 40 may be configured by hardware, by a single or a plurality of integrated circuits or the like. In addition, for example, the functions provided by the control apparatus 40 may be configured by software that is recorded in a non-transitory computer-readable storage medium and a computer that runs the software.

The control apparatus 40 acquires the angle signal from the angle detecting unit 41, and generates drive signals to turn on/off the switches SUp to SWn that configure the inverter 20, based on the acquired angle signal. Specifically, when the rotating electric machine 30 is driven as the electric motor, the control apparatus 40 generates the drive signals to turn on/off the arm switches SUp to SWn so as to convert direct-current power outputted from the direct-current power supply 10 to alternating-current power and supply the alternating-current power to the U-, V-, and W-phase windings 31U, 31V, and 31W. The control apparatus 40 supplies the generated drive signals to the gates of the arm switches SUp to SWn. Meanwhile, when the rotating electric machine 30 is driven as the power generator, the control apparatus 40 generates the drive signals to turn on/off the arm switches SUp to SWn so as to convert alternating-current power outputted from the U-, V-, and W-phase windings 31U, 31V, and 31W to direct-current power and supply the direct-current power to the direct-current power supply 10.

Figure 5:
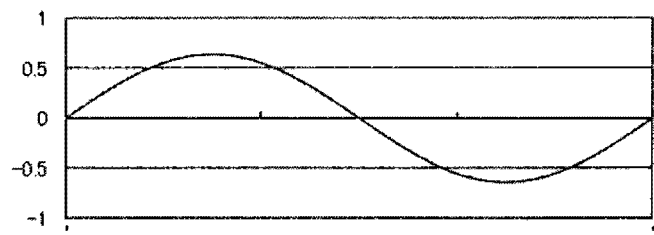
Figure 5:
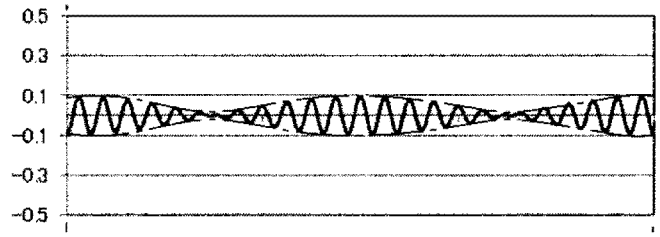
Figure 5:
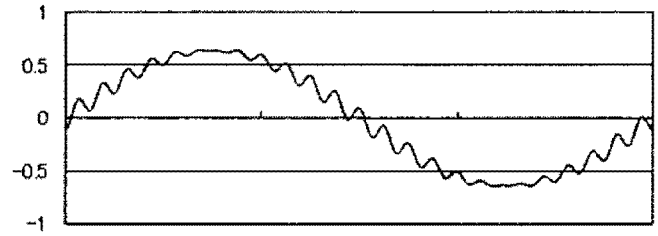
Figure 6:
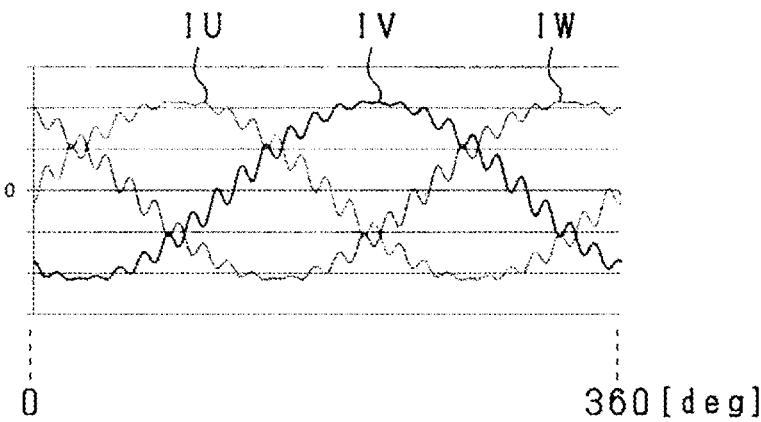
FIG. 6 is a diagram of transitions in a three-phase current.

The control apparatus 40 turns on/off the switches SUp to SWn so that a composite current of a fundamental current and a harmonic current is supplied to the phase windings 31U, 31V and 31W. As shown in FIG. 5(a), the fundamental current is a current that mainly generates torque in the rotating electric machine 30. As shown in FIG. 5(b), the harmonic current is a current that mainly excites the field winding 70. FIG. 5(c) shows a phase current that is a composite current of the fundamental current and the harmonic current. Values on a vertical axis shown in FIG. 5 indicate a corresponding relationship with a magnitude of a waveform shown in each of FIG. 5(a) to FIG. 5(c). As shown in FIG. 6, phase currents IU, IV, and IW that flow to the phase windings 31U, 31V, and 31W are shifted from each other by 120° electrical angle.

According to the present embodiment, as shown in FIG. 5(a) and FIG. 5(b), an envelope curve of the harmonic current has a period that is half that of the fundamental current. The envelope curve is shown by a single-dot chain line in FIG. 5(b). A timing at which the envelope curve reaches a peak value thereof is shifted from a timing at which the fundamental current reaches a peak value thereof. Specifically, a timing at which the envelope curve reaches the peak value thereof is a timing at which the fundamental current is at a variation center (0) thereof. The control apparatus 40 independently controls respective amplitudes and periods of the fundamental current and the harmonic current.

According to the present embodiment, a frequency fh of the harmonic current is a frequency that is the same as or near a first resonance frequency f1 of a resonance circuit that is configured by the first winding portion 71a and the capacitor 91, or a second resonance frequency f2 of a resonance circuit that is configured by the second winding portion 71b and the capacitor 91. The resonance frequencies f1 and f2 are expressed by expression (eq 1), below.

$$f1 = \frac{1}{2\pi\sqrt{L1 \times C}}$$
$$f2 = \frac{1}{2\pi\sqrt{L2 \times C}}$$
(eq1)

Next, effects obtained as a result of the capacitor 91 and the partitioning portion 80 being provided will be described in comparison to a comparison example.

Figure 7:
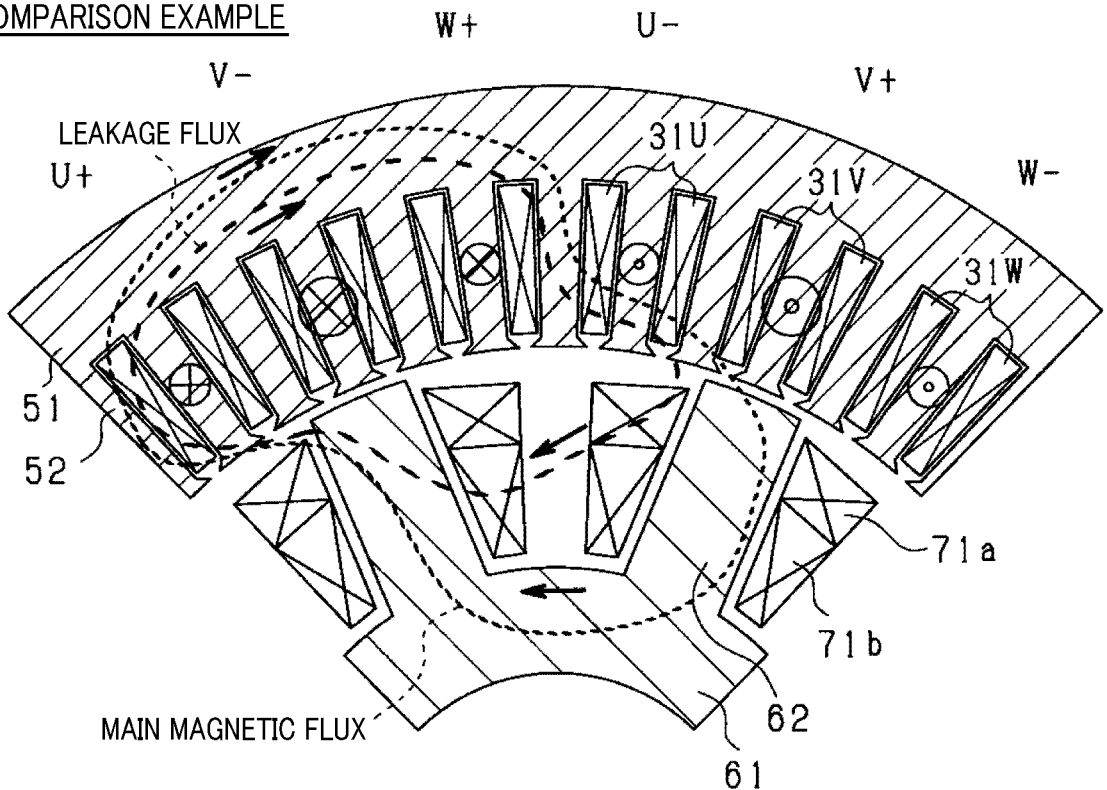
FIG. 7 is a lateral cross-sectional view of a rotor and a stator of a comparison example.
Figure 8:
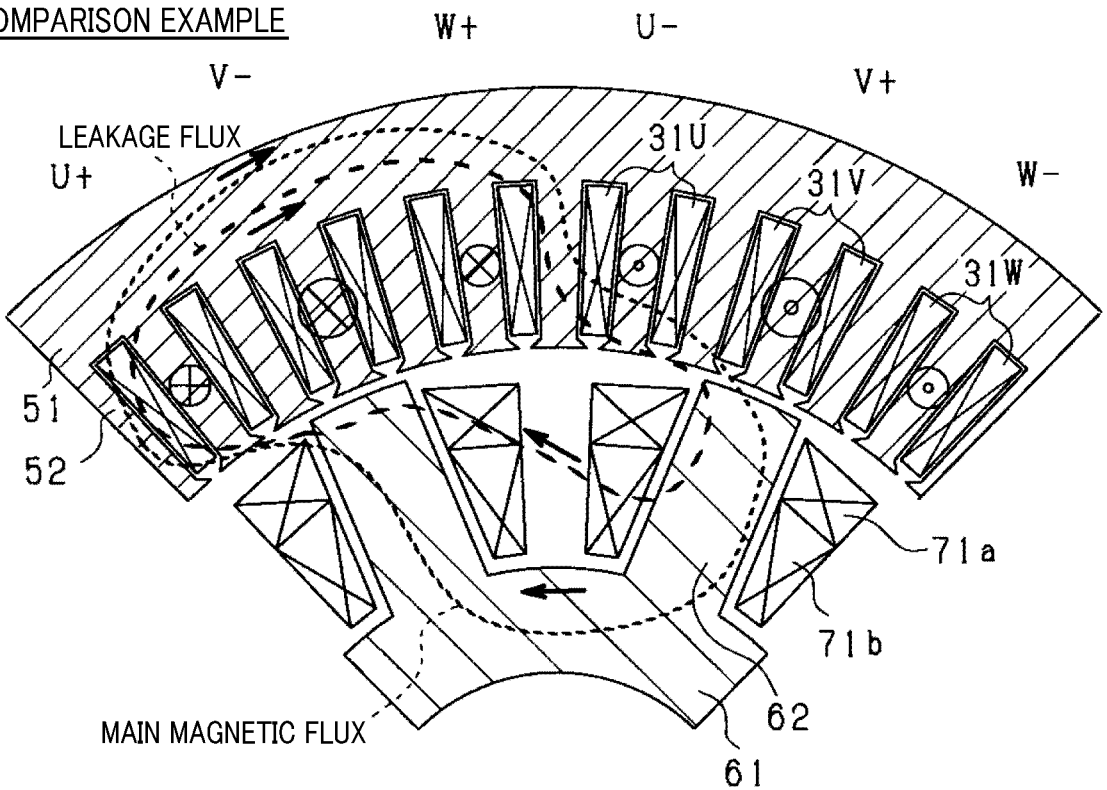
FIG. 8 is a lateral cross-sectional view of the rotor and the stator of the comparison example.

First, the comparison example will be described. As shown in FIG. 7 and FIG. 8, the comparison example is a configuration in which the partitioning portion 80 and the capacitor 91 are omitted from the configuration according to the present embodiment.

When the harmonic current flows to the phase windings 31U, 31V, and 31W, a main magnetic flux flows to a magnetic circuit that includes the main pole portions 62 that are adjacent in the circumferential direction, the rotor core 61, the teeth 52, and the stator core 51. As a result of the main magnetic flux flowing, an induced voltage is generated in each of the first and second winding portions 71a and 71b. Currents are induced in the first and second winding portions 71a and 71b. At this time, as shown in generated patterns 1 and 4 in FIG. 9, when induced voltages that have the same polarity are respectively generated in the first and second winding portions 71a and 71b, the respective induced currents of the first and second winding portions 71a and 71b are not cancelled out. Therefore, the induced current increases. As a result of the diode 90, the currents that flow to the first and second winding portions 71a and 71b are rectified to flow in one direction. As a result, the field current flows to the field winding 70 in the direction of rectification by the diode 90, and the field winding is excited. Here, in FIG. 9, e1 denotes the induced voltage that is generated in the first winding portion 71a, and e2 denotes the induced voltage that is generated in the second winding portion 71b.

Meanwhile, when the harmonic current flows, a leakage flux is generated in addition to the main magnetic flux. As shown in FIG. 7 and FIG. 8, the leakage flux flows so as to cross from one to the other of the main pole portions 62 that are adjacent in the circumferential direction, without passing through the rotor core 61, and is linked with the field winding 70. At this time, a leakage flux that is linked with only with intermediate portions of the winding portions 71a and 71b is also generated. When the leakage flux is linked with the field winding 70, in the first winding portion 71a, induced voltages that are of opposite polarities are generated, and the current that is induced in the first winding portion 71a decreases. In addition, in the second winding portion 71b as well, induced voltages that are of opposite polarities are generated, and the current that is induced in the second winding portion 71b decreases. As a result, a total value of the currents respectively induced in the first and second winding portions 71a and 71b decreases. Furthermore, the field current flowing to the field winding 70 decreases.

Here, to compensate for the decrease in field current, increasing the amplitude of the harmonic current that is supplied to the phase windings 31U, 31V, and 31W can be considered. However, in this case, increase in torque ripples in the rotating electric machine 30 becomes a concern.

Figure 11:
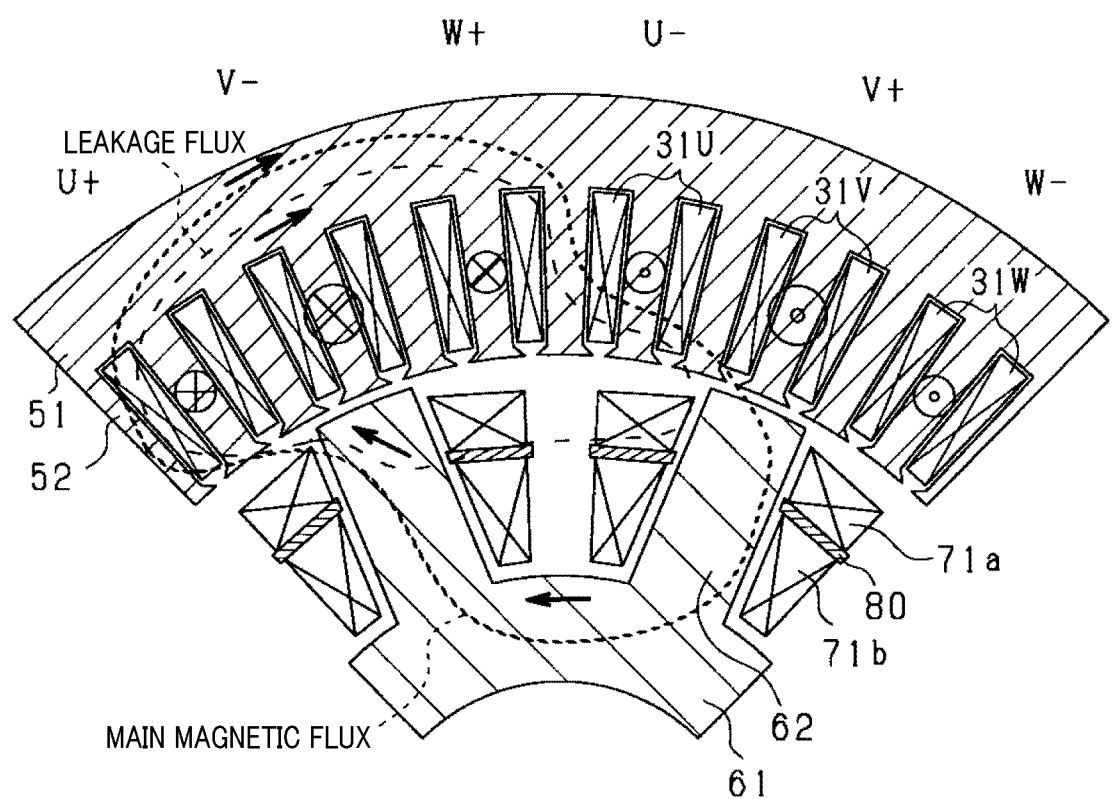
FIG. 11 is a lateral cross-sectional view of the rotor and the stator of according to the first embodiment.

Therefore, according to the present embodiment, the partitioning portion 80 is provided. As a result, as shown in FIG. 11, a large portion of the leakage flux flows to the partitioning portion 80 rather than the field winding 70. Consequently, the induced voltages that are of opposite polarities are not easily generated in each of the first and second winding portions 71a and 71b. The currents that are induced increase. As a result, in the generated patterns 1 to 4 shown in FIG. 9, the currents that are respectively induced in the first and second winding portions 71a and 71b can be increased.

In addition, according to the present embodiment, the capacitor 91 is connected in parallel to the second winding portion 71b. Therefore, as shown in generated patterns 2 and 3 in FIG. 9, even in cases in which the induced voltages respectively generated in the first and second winding portions 71a and 71b have opposite polarities, the induced currents flow via the capacitor 91. Therefore, the induced currents that flow to the first and second winding portions 71a and 71b do not cancel each other out. Therefore, as shown in FIG. 10(a), the current that is induced in the first winding portion 71a and the current that is induced in the second winding portion 71b flow towards the anode side of the diode 90 via the capacitor 91 and, as shown in FIG. 10(b), flow towards the anode side of the diode 90 from the capacitor 91 through the second winding portion 71b. As a result, the field current that flows to the field winding 70 can be increased. At this time, because the induced current is increased by the partitioning portion 80, the effect of increasing the field current obtained by the capacitor 91 can be further enhanced. Therefore, the amplitude of the harmonic current that flows to the phase windings 31U, 31V, and 31W can be reduced. Furthermore, torque ripples in the rotating electric machine 30 can be reduced.

Figure 12:
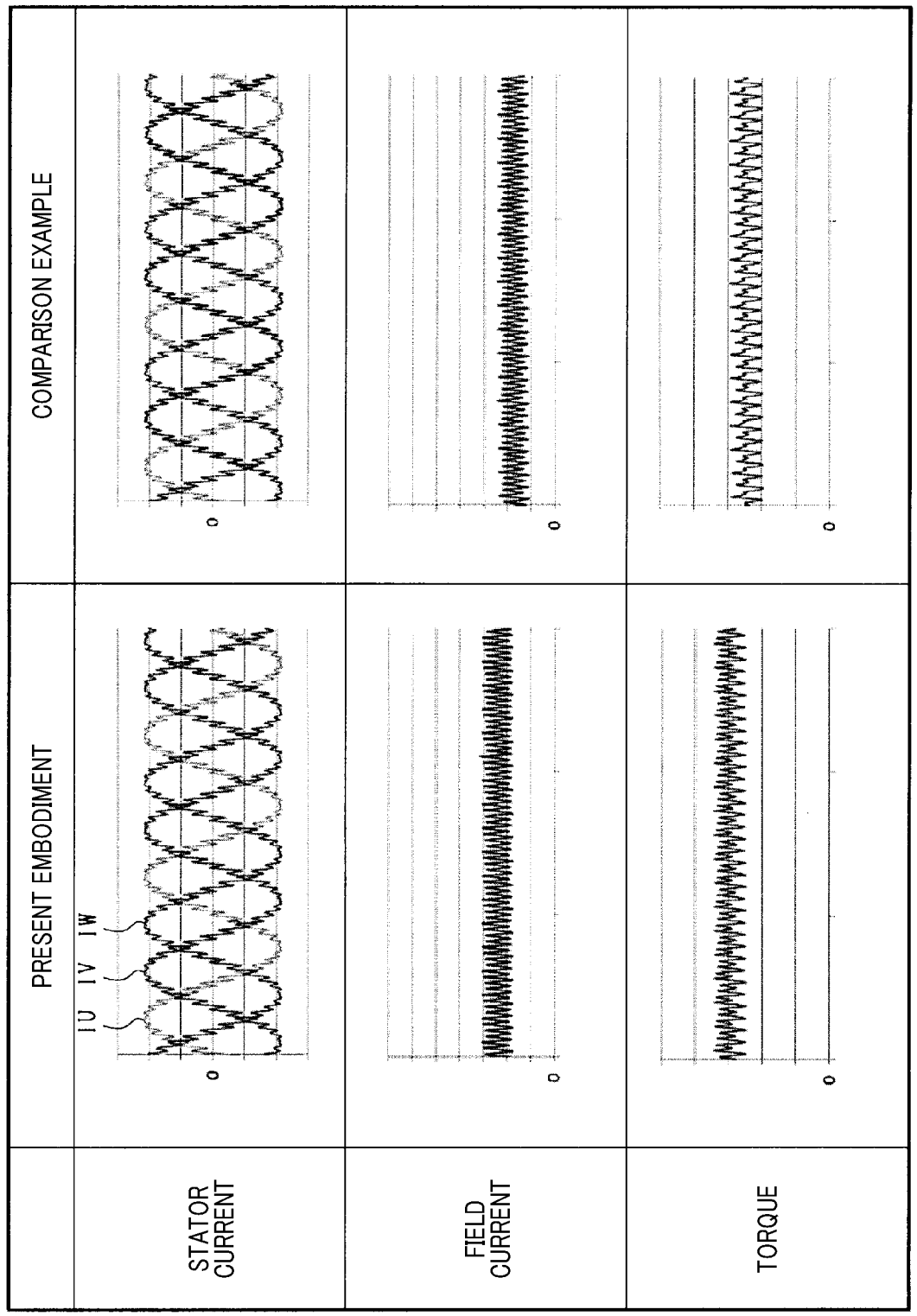
FIG. 12 is a diagram of transitions in a three-phase current, a field current, and torque.
Figure 13:
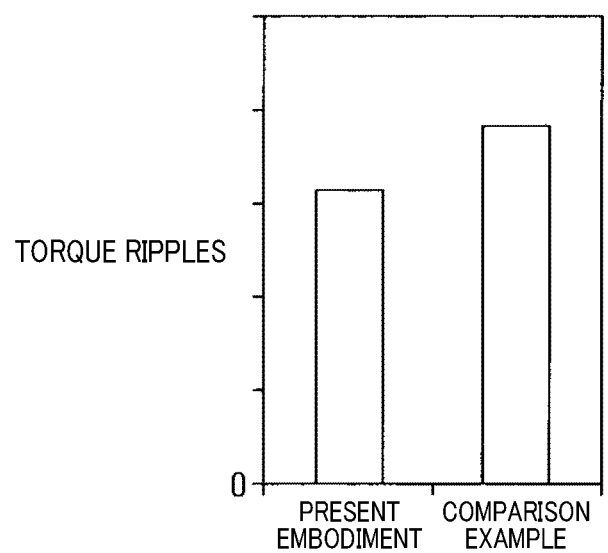
FIG. 13 is a diagram of an effect of reducing torque ripples.

FIG. 12 shows transitions in the phase currents IU, IV, and IW, the field current, and the torque according to the present embodiment and those in the comparison example. According to the present embodiment, because the field current can be increased, the amplitude of the harmonic current that flows to the phase windings 31U, 31V, and 31W can be reduced. As a result, the torque ripples in the rotating electric machine 30 can be reduced. According to the present embodiment, as shown in FIG. 13, the torque ripples can be reduced by about 20%.

According to the present embodiment, the partitioning portion 80 is configured to extend in the circumferential direction. As a result of this configuration, a magnetic path that leads the leakage flux from one to the other of the main pole portions 62 that are adjacent in the circumferential direction, via the partitioning portion 80, can be appropriately constructed. The field current can be further increased.

According to the present embodiment, a gap is formed between the partitioning portions 80 that are adjacent in the circumferential direction. Therefore, the main magnetic flux flowing from one to the other of the main pole portions 62 that are adjacent in the circumferential direction, via the partitioning portion 80, can be suppressed. Specifically, for example, a magnetic flux circulating through a magnetic circuit that includes the partitioning portion 80, the rotor core 61, and the main pole portions 62 that are adjacent in the circumferential direction can be suppressed. As a result, decrease in the main magnetic flux that flows to the magnetic circuit that includes the main pole portions 62 that are adjacent in the circumferential direction and the rotor core 61 can be suppressed. Decrease in the field current can be suppressed.

According to the present embodiment, the respective resonance frequencies f1 and f2 of the resonance circuit that is configured by the first winding portion 71a and the capacitor 91, and the resonance circuit that is configured by the second winding portion 71b and the capacitor 91 are the frequency fh of the harmonic current. Therefore, the currents that are induced in the first and second winding portions 71a and 71b can be further increased. The field current can be further increased.

The timing at which the envelope curve of the harmonic current that flows to the phase windings 31U, 31V, and 31W reaches the peak value thereof is set to a timing that is the same as the timing at which the fundamental current that flows to the phase windings 31U, 31V, and 31W becomes 0. As a result, a maximum value of the phase currents that flow to the phase windings 31U, 31V, and 31W can be reduced. The torque of the rotating electric machine 30 can be set to the commanded torque without the capacity of the inverter 20 being increased.

Variation Example 1 According to the First Embodiment

Figure 14:
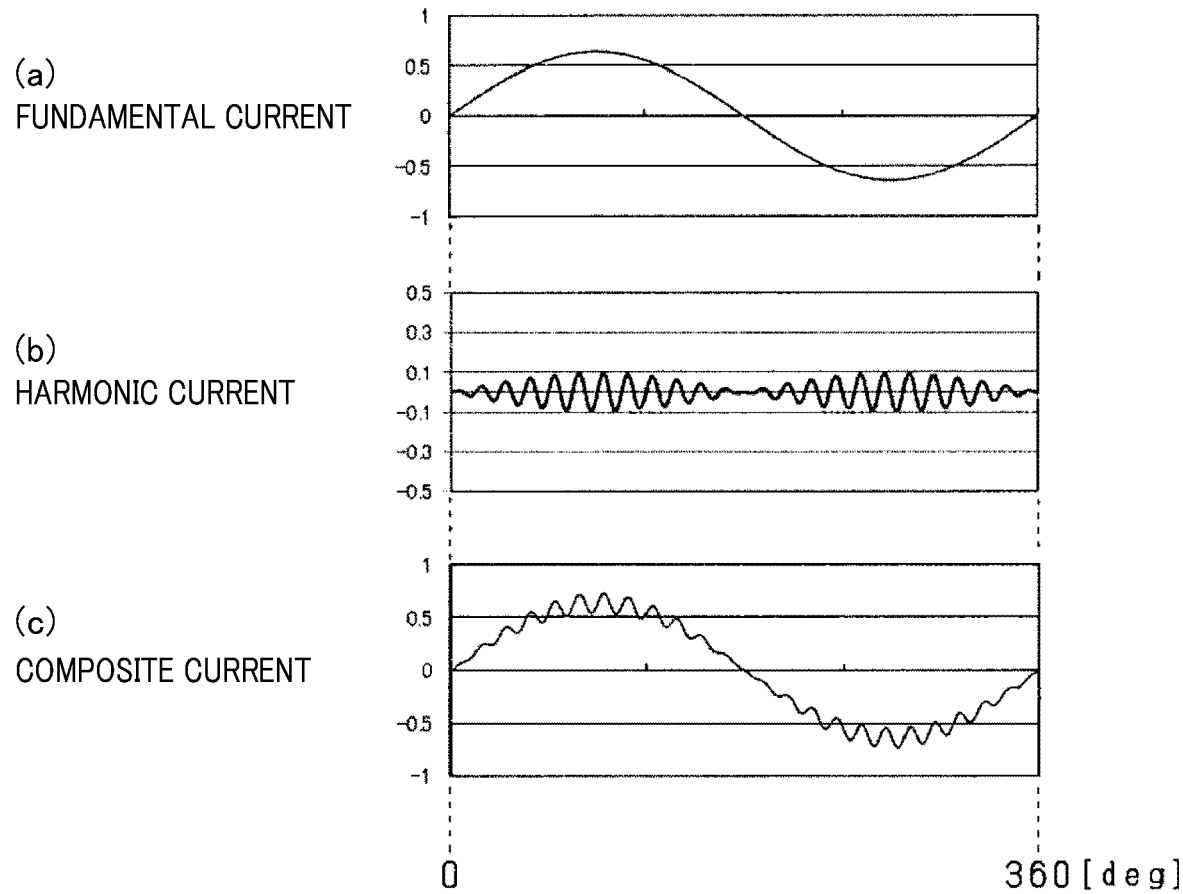
FIG. 14 is a diagram of transitions in a fundamental current, a harmonic current, and the like in a variation example 1 according to the first embodiment.

The harmonic current that flows to the phase windings 31U, 31V, and 31W may be that shown in FIG. 14(b). FIGS. 14(a) and (c) correspond to FIGS. 5(a) and (c), above.

Figure 15:
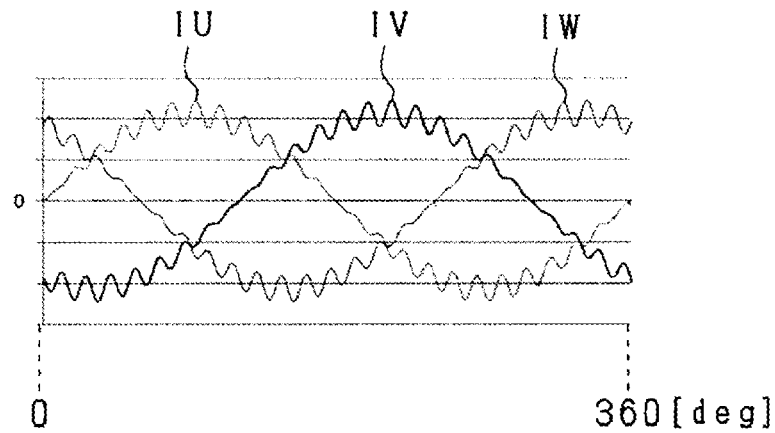
FIG. 15 is a diagram of transitions in a three-phase current in the variation example 1 according to the first embodiment.

According to the present embodiment, as shown in FIG. 14(a) and FIG. 14(b), the timing at which the envelope curve of the harmonic current reaches the peak value thereof is the timing at which the fundamental current reaches the peak value thereof. The harmonic current shown in FIG. 14(b) is that in which the phase of the harmonic current shown in FIG. 5(b) is shifted by an amount amounting to ¼ of the period of the fundamental current. FIG. 15 shows transitions in the phase currents IU, IV, and IW that flow to the phase windings 31U, 31V, and 31W according to the present embodiment.

Variation Example 2 According to the Second Embodiment

Figure 16:
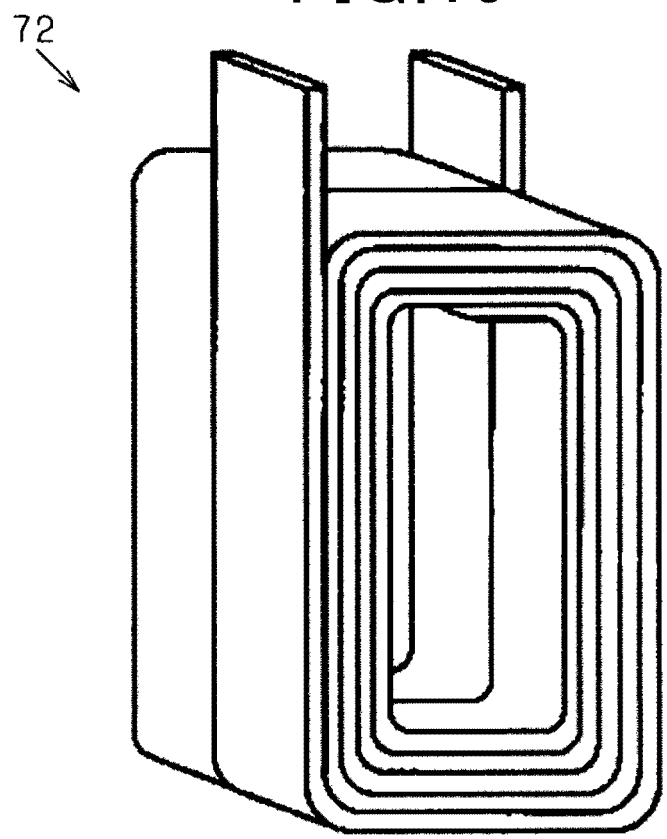
FIG. 16 is a perspective view of a winding portion in a variation example 2 according to the first embodiment.

As shown in FIG. 16, each of the first and second winding portions of the field winding may be configured by an alpha (α) winding that uses a rectangular wire. As a result of the rectangular wire being used, space factor of the field winding can be increased. Here, for example, as the winding portion that is an α winding that uses a rectangular wire, a winding portion shown in FIG. 5(A) in JP-A-2008-178211 can be used.

Figure 17:
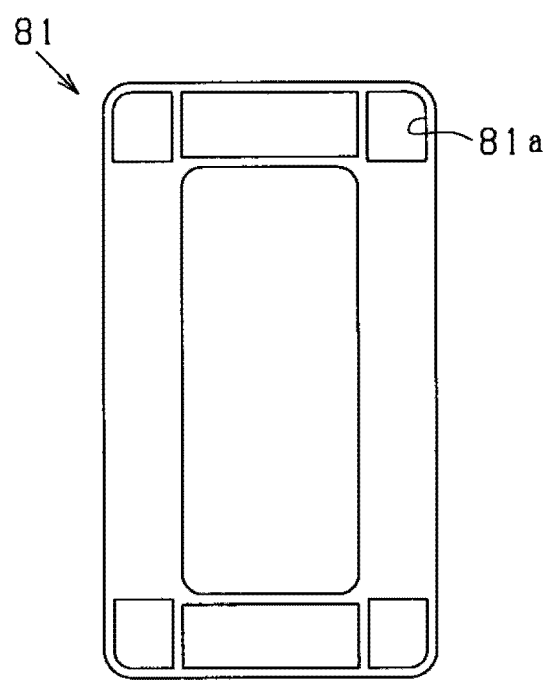
FIG. 17 is a plan view of a partitioning portion in the variation example 2 according to the first embodiment.

As shown in FIG. 17, an annular partitioning portion 81 may be used. The partitioning portion 81 has a flattened shape. The partitioning portion 81 is assembled to the main pole portion 62 by a through-hole that is formed in a center portion thereof being inserted into the main pole portion 62. Here, the second winding portion, the partitioning portion 81, and the first winding portion are assembled to the main pole portion 62 in this order. In addition, a hole 81a that passes through the partitioning portion 81 in the thickness direction may be formed in the partitioning portion 81. In this case, eddy currents can be reduced. Here, in FIG. 17, an example in which six holes 81a are formed in the partitioning portion 81 is shown.

According to the present embodiment, because the field winding can be assembled so as to be inserted into the main pole portion 62 in the radial direction, assembly of the field winding can be improved. In addition, as a result of the alpha winding, start of winding and end of winding of the field winding face the same direction. Therefore, connection of the winding portions of the field winding, the diode 90, and the capacitor 91 can be easily performed.

Variation Example 3 According to the Present Embodiment

In FIG. 2, orientations of the anode and the cathode of the diode 90 may be opposite. In addition, the capacitor 91 may be connected in parallel to the first winding portion 71a, instead of the second winding portion 71b.

Second Embodiment

Figure 18:
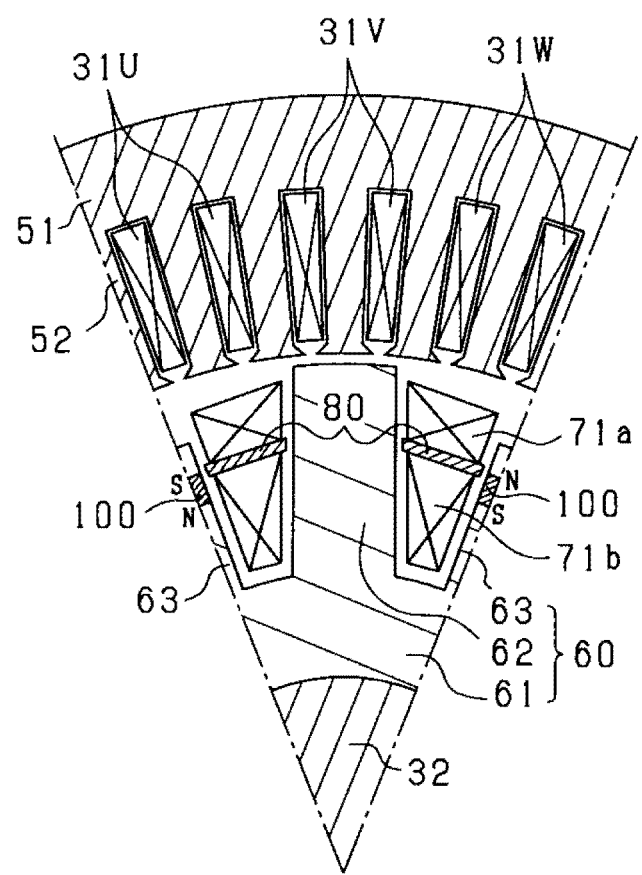
FIG. 18 is a lateral cross-sectional view of a rotor and a stator according to a second embodiment.

According to a present embodiment, as shown in FIG. 18, the rotor 60 includes interpole portions 63 that protrude from the rotor core 61 towards the outer side in the radial direction, and a permanent magnet 100 that is provided in the interpole portion 63. The interpole portions 63 are provided at predetermined intervals in the circumferential direction, and provided between the field windings 70 that are adjacent in the circumferential direction. According to the present embodiment, the rotor 60 includes eight interpole portions 63. The interpole portions 63 that are adjacent in the circumferential direction are provided such that polarities in the radial direction are opposite each other.

According to the present embodiment, leakage flux between the main pole portions 62 that are adjacent in the circumferential direction can be suppressed. Excitability of the field winding 70 can be improved.

Third Embodiment

Figure 19:
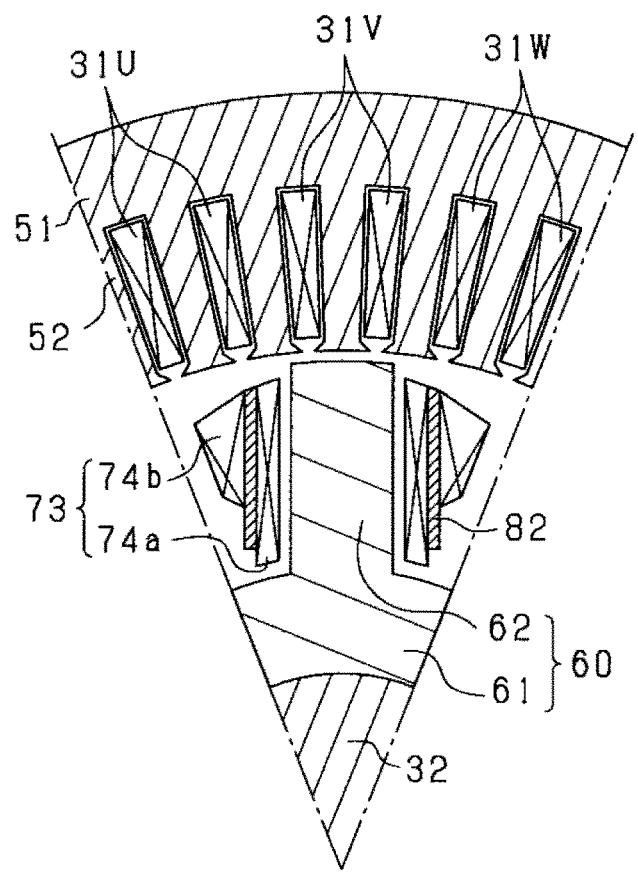
FIG. 19 is a lateral cross-sectional view of a rotor and a stator according to a third embodiment.

According to a present embodiment, as shown in FIG. 19, a winding aspect of a first winding portion 74a and a second winding portion 74b configuring a field winding 73 are modified. Specifically, the first winding portion 74a is wound around the main pole portion 62, and the second winding portion 74b is wound around an outer side of the first winding portion 74a. A partitioning portion 82 is disposed between the first winding portion 74a and the second winding portion 74b.

Variation Example According to the Third Embodiment

Figure 20:
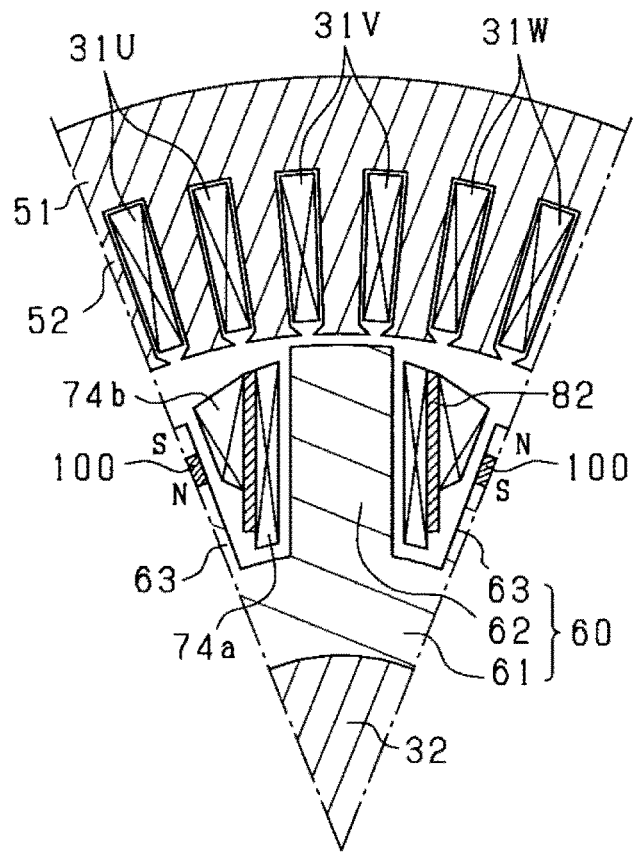
FIG. 20 is a lateral cross-sectional view of a rotor and a stator in a variation example according to the third embodiment.

As shown in FIG. 20, the interpole portion 63 and the permanent magnet 100 described according to the second embodiment may be provided in the configuration according to the third embodiment.

Fourth Embodiment

Figure 21:
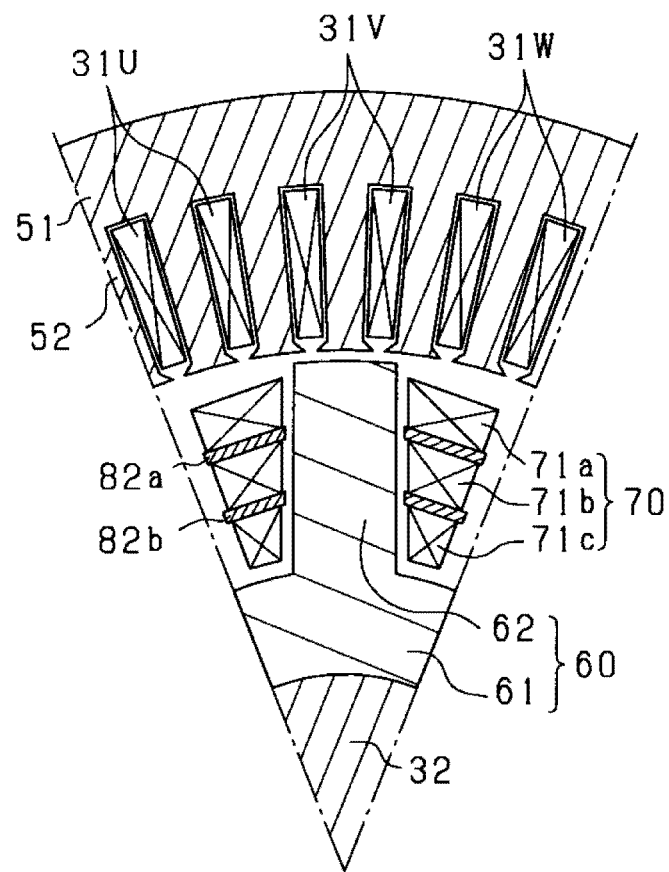
FIG. 21 is a lateral cross-sectional view of a rotor and a stator according to a fourth embodiment.
Figure 22:
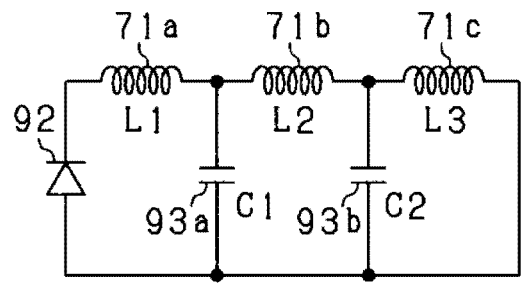
FIG. 22 is a diagram of an electrical circuit provided in the rotor.

According to a present embodiment, as shown in FIG. 21 and FIG. 22, the field winding 70 includes a series-connection body including the first winding portion 71a, the second winding portion 71b, and a third winding portion 71c. In each main pole portion 62, the first winding portion 71a is wound on the outermost side in the radial direction, the second winding portion 71*b* is wound further towards the inner side in the radial direction than the first winding portion 71*a*, and the third winding portion 71*c* is wound further towards the inner side in the radial direction than the second winding portion 71*b*. In the main pole portion 62, the winding directions of the winding portions 71*a*, 71*b*, and 71*b* are the same. In addition, the winding direction of the winding portions 71*a*, 71*b*, and 71*c* wound around one of the main pole portions 62 that are adjacent in the circumferential direction, and the winding direction of the winding portions 71*a*, 71*b*, and 71*c* wound around the other of the main pole portions 62 are opposite.

In the rotor 60, a first partitioning portion 82*a* that includes a soft magnetic material is provided between the first winding portion 71*a* and the second winding portion 71*b*. A second partitioning portion 82*b* that includes a soft magnetic material is provided between the second winding portion 71*b* and the third winding portion 71*c*. The radial-direction thickness of each of the partitioning portions 82*a* and 82*b* is less than the radial-direction thickness of each of the winding portions 71*a*, 71*b*, and 71*c*. The partitioning portions 82*a* and 82*b* may each be configured by the soft magnetic material being laminated in the radial direction.

FIG. 22 shows an electrical circuit on the rotor side that includes the winding portions 71*a*, 71*b*, and 71*c* that are wound around a common main pole portion 62. A diode 92, a first capacitor 93*a*, and a second capacitor 93*b* are provided in the rotor 60. A first end of the third winding portion 71*c* is connected to the second end of the second winding portion 71*b*. An anode of the diode 92 is connected to a second end of the third winding portion 71*c*. The anode of the diode 92 is connected to the connection point between the first winding portion 71*a* and the second winding portion 71*b*, via the first capacitor 93*a*. The anode of the diode 92 is connected to the connection point between the second winding portion 71*b* and the third winding portion 71*c*, via the second capacitor 93*b*. In FIG. 22, L3 denotes inductance in the third winding portion 71*c*, and C1 and C2 denote capacitance of the first and second capacitors 93*a* and 93*b*.

According to the present embodiment, the resonance frequency of a first resonance circuit configured by the first winding portion 71*a* and the first capacitor 93*a* is f1. The resonance frequency of a second resonance circuit configured by the second winding portion 71*b* and the first and second capacitors 93*a* and 93*b* is f2. The resonance frequency of a third resonance circuit configured by the third winding portion 71*c* and the second capacitor 93*b* is f3. The resonance frequencies f1, f2, and f3 are expressed by expression (eq 2), below. Here, Ct denotes a combined capacity of C1 and C2.

$$f1 = \frac{1}{2\pi\sqrt{L1 \times C1}} \quad \text{(eq2)}$$
$$f2 = \frac{1}{2\pi\sqrt{L2 \times Ct}}$$
$$f3 = \frac{1}{2\pi\sqrt{L3 \times C2}}$$
$$Ct = \frac{C1 \times C2}{C1 + C2}$$

According to the present embodiment, "f1<f2=fh<f3". Therefore, in addition the second resonance circuit in which the frequency fh of the harmonic current is the resonance frequency f2, the first and third resonance circuits in which frequencies differing from the frequency fh of the harmonic current are the resonance frequencies f1 and f3 can be actualized.

Therefore, for example, even in cases in which the frequency of the harmonic current that is supplied to the phase windings 31U, 31V, and 31W is shifted from a frequency that has been set, as long as the shifted frequency is the resonance frequencies f1 and f3 of the first and third resonance circuits, the effect of increasing the field current can be obtained at the frequency.

Here, for example, a phenomenon in which the frequency of the harmonic current is shifted from a frequency that has been set may occur in a region in which an electrical angle frequency of the rotating electric machine 30 is high. A reason for this is that, as the electrical angle frequency increases, a number n (n being a natural number) of harmonic currents that can be superposed on a single period of the fundamental current decreases, and frequency variation when the number of superposed harmonic currents changes from n to n−1 becomes significant.

For example, when n changes between 4 and 3, a variation in frequency of 30%, more or less, occurs. The frequency fh of the harmonic current before and after the change varies by at least about 30%. n=3 indicates that the harmonic current amounting to three periods is included in a single period of the fundamental current for a single phase of the three-phase current. This is considered to be a minimum unit as an excitation frequency of the field winding.

Variation Example 1 According to the Fourth Embodiment

Figure 23:
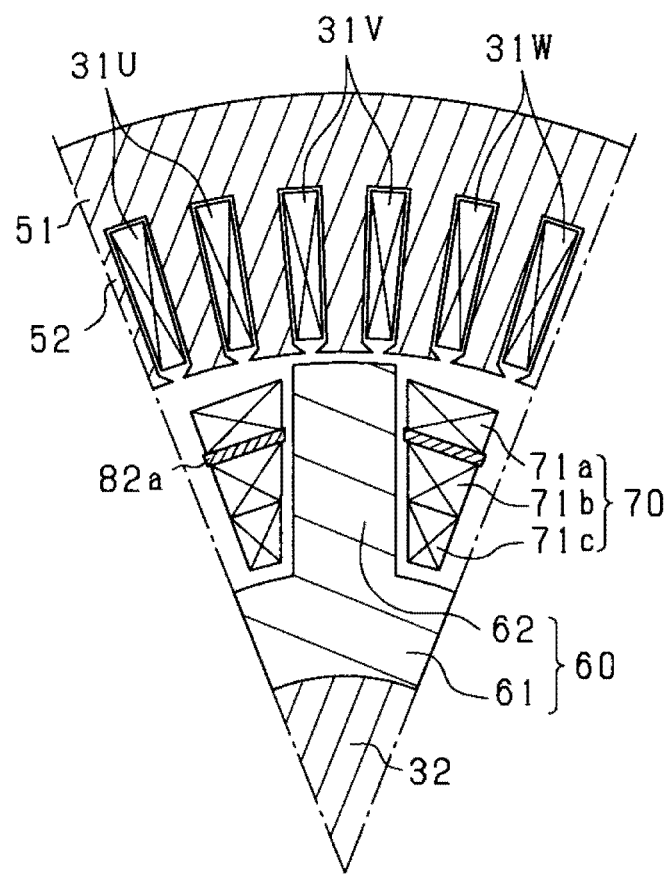
FIG. 23 is a lateral cross-sectional view of a rotor and a stator in a variation example 1 according to the fourth embodiment.

As shown in FIG. 23, the configuration according to the fourth embodiment may not include the second partitioning portion 82*b*.

Variation Example 2 According to the Fourth Embodiment

As shown in FIG. 22, orientations of the anode and the cathode of the diodes 92 may be reversed.

Other Embodiments

Here, the above-described embodiments may be modified in the following manner.

In FIG. 2 according to the first embodiment, the second resonance frequency f2 of the resonance circuit that is configured by the second winding portion 71*b* and the capacitor 91 is higher than the resonance frequency f1 of the resonance circuit that is configured by the first winding portion 71*a* and the capacitor 91. In this case, the frequency fh of the harmonic current that is superposed on the fundamental current is preferably close to the first and second resonance frequencies f1 and f2.

Figure 24:
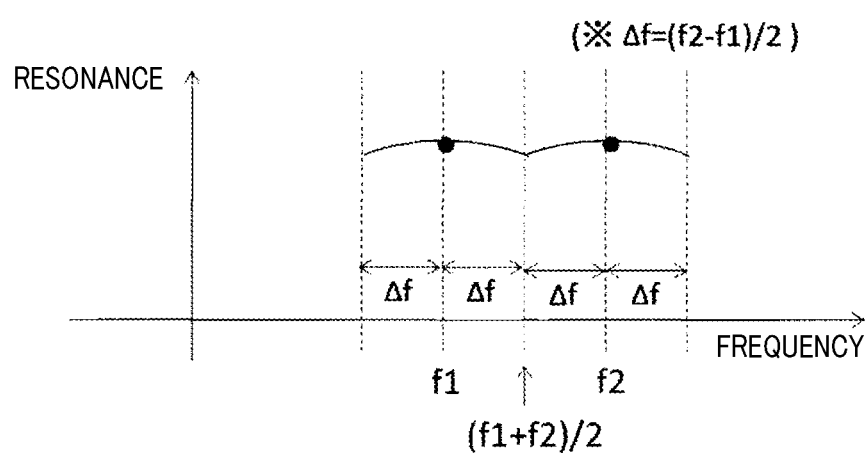
FIG. 24 is a diagram of a relationship between frequency of a harmonic current and resonance characteristics according to another embodiment.

In addition, to improve resonance characteristics, the first resonance frequency f1 and the second resonance frequency f2 should be set to values that are as closest as possible. Here, resonance characteristics being improved means that impedance in the resonance circuit is low, that is, the field current that can be induced in the field winding is large. As shown in FIG. 24, when a median value of the variation in frequency that is the target of the harmonic current is (f1+f2)/2, the variation range is preferably between the first resonance frequency f1 and the second resonance frequency f2. However, this is not limited thereto. This will be described below.

Resonance characteristics of the resonance circuit can be considered to be equal before and after the resonance frequency of the circuit. Therefore, when a deviation between the median value "(f1+f2)/2" of the variation in frequency and the resonance frequencies f1 and f2 is frequency deviation Δf=(=(f2−f1)/2), equal resonance can be expected over a frequency range from "f1−Δf" to "f2+fΔ".

Figure 25:
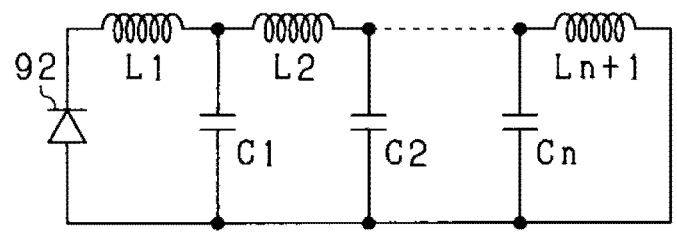
FIG. 25 is a diagram of an electrical circuit provided in a rotor according to another embodiment.

As shown in FIG. 25, the field winding may be configured by a series-connection body including four or more winding portions. In this case, when a number of winding portions is N+1, a number of capacitors is N.

Figure 26:
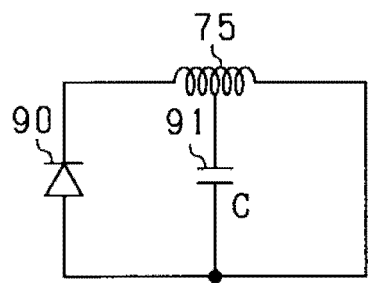
FIG. 26 is a diagram of an electrical circuit provided in a rotor according to another embodiment.

According to the above-described embodiments, the capacitor is connected in a section other than the winding portions of the field winding. Instead of this configuration, as shown in FIG. 26, the capacitor 91 may be connected in the middle of the winding portion of the field winding 75. In this case, portions of the field winding 75 that are divided by a connection point of the capacitor 91 correspond to the winding portions.

The rotating electric machine is not limited to an inner-rotor type and may be an outer-rotor type. In this case, the main pole portions protrude from the rotor core towards the inner side in the radial direction.

A rectifying element other than the diode may be used as long as the rectifying element is an element that rectifies the field current that flows to the field winding to flow in one direction.

While the present disclosure has been described with reference to embodiments, it is to be understood that the disclosure is not limited to the embodiments and constructions. The present disclosure covers various modification examples and modifications within the range of equivalency. In addition, various combinations and configurations, and further, other combinations and configurations including more, less, or only a single element thereof are also within the spirit and scope of the present disclosure.

What is claimed is:

1. A field-winding-type rotating electric machine comprising:
    a stator that includes a stator winding;
    a field winding that includes a series-connection body including a plurality of winding portions; and
    a rotor that includes a rotor core, and main pole portions that are provided at predetermined intervals in a circumferential direction and protrude from the rotor core in a radial direction, wherein
    each of the plurality of winding portions is wound around the main pole portion, and a harmonic current for inducing a field current in the field winding flows to the stator winding, and
    the field-winding-type rotating electric machine includes
        a rectifying element that is connected in series to the field winding, configures a closed circuit with the field winding, and rectifies the field current that flows to the field winding to flow in one direction,
        a capacitor of which a first end is connected to a connection point between adjacent winding portions and a second end is connected to either of both ends of the rectifying element, and
        a partitioning portion that is disposed between at least a single set of adjacent winding portions among the plurality of winding portions, and includes a magnetic material.

2. The field-winding-type rotating electric machine according to claim 1, wherein:
    the plurality of winding portions are each wound around the main pole portion so as to be arranged in the radial direction; and
    the partitioning portion is configured to extend in the circumferential direction.

3. The field-winding-type rotating electric machine according to claim 2, wherein:
    a gap is formed between partitioning portions that are adjacent in the circumferential direction.

4. The field-winding-type rotating electric machine according to claim 1, wherein:
    an envelope curve of the harmonic current that flows to the stator has a period that is half that of a fundamental current that flows to the stator winding, and a timing at which the envelope curve reaches a peak value thereof is shifted from a timing at which the fundamental current reaches a peak value thereof.

5. The field-winding-type rotating electric machine according to claim 4, wherein:
    the timing at which the envelope curve reaches the peak value thereof is a same timing as a timing at which the fundamental current is at a variation center thereof.

6. The field-winding-type rotating electric machine according to claim 1, wherein:
    a resonance frequency of at least either of a resonance circuit that is configured by the capacitor and one winding portion, of the adjacent winding portions to which the capacitor is connected, and a resonance circuit that is configured by the other winding portion and the capacitor is a frequency of the harmonic current that flows to the stator winding.

7. The field-winding-type rotating electric machine according to claim 6, wherein:
    the field winding includes a series-connection body including three or more winding portions;
    the capacitor is individually provided in correspondence to each connection point between the adjacent winding portions; and
    resonance frequencies of the resonance circuits corresponding to the winding portions differ from each other.

8. The field-winding-type rotating electric machine according to claim 1, wherein:
    the field winding is configured by an alpha winding.

9. The field-winding-type rotating electric machine according to claim 1, wherein:
    a first resonance frequency of a resonance circuit that is configured by one winding portion, of the adjacent winding portions to which the capacitor is connected, and the capacitor is a value that is less than a second resonance frequency of a resonance circuit that is configured by the other winding portion and the capacitor; and
    when a deviation between a median value of the first resonance frequency and the second resonance frequency and each of the first resonance frequency and the second resonance frequency is a frequency deviation, the frequency of the harmonic current that flows to the stator winding is set to be in a range from a value obtained by the frequency deviation being subtracted from the first resonance frequency to a value obtained by the frequency deviation being added to the second resonance frequency.

10. A field-winding-type rotating electric machine comprising:
- a stator that includes a stator winding;
- a field winding that includes a series-connection body including a plurality of winding portions; and
- a rotor that includes a rotor core, and main pole portions that are provided at predetermined intervals in a circumferential direction and protrude from the rotor core in a radial direction, wherein each of the plurality of winding portions is wound around the main pole portion, and a harmonic current for inducing a field current in the field winding flows to the stator winding, the field-winding-type rotating electric machine includes
- a rectifying element that is connected in series to the field winding, configures a closed circuit with the field winding, and rectifies the field current that flows to the field winding to flow in one direction, and
- a capacitor of which a first end is connected to a connection point between adjacent winding portions and a second end is connected to either of both ends of the rectifying element,
- a first resonance frequency of a resonance circuit that is configured by the capacitor and one winding portion, of the adjacent winding portions to which the capacitor is connected, is less than a second resonance frequency of a resonance circuit that is configured by the other winding portion and the capacitor, and
- when a deviation between a median value of the first resonance frequency and the second resonance frequency and each of the first resonance frequency and the second resonance frequency is a frequency deviation, the frequency of the harmonic current that flows to the stator winding is set to be in a range from a value obtained by the frequency deviation being subtracted from the first resonance frequency to a value obtained by the frequency deviation being added to the second resonance frequency.

* * * * *